(12) United States Patent
Macfarlane et al.

(10) Patent No.: US 7,236,885 B2
(45) Date of Patent: Jun. 26, 2007

(54) METHOD AND SYSTEM FOR GEOPHYSICAL DATA ACQUISITION ON AN AIRSHIP

(75) Inventors: John Macfarlane, Aberdeen (GB); John Brett, Kinnelon, NJ (US)

(73) Assignee: Bell Geospace, Inc., Houston, TX (US)

( * ) Notice: Subject to any disclaimer, the term of this patent is extended or adjusted under 35 U.S.C. 154(b) by 52 days.

(21) Appl. No.: 11/177,633

(22) Filed: Jul. 8, 2005

(65) Prior Publication Data

US 2007/0010946 A1 Jan. 11, 2007

(51) Int. Cl.
*G01V 7/16* (2006.01)

(52) U.S. Cl. .......................................... 702/2

(58) Field of Classification Search ............... 702/2, 702/5, 12, 13
See application file for complete search history.

(56) References Cited

U.S. PATENT DOCUMENTS

| | | | | |
|---|---|---|---|---|
| 2,635,134 | A * | 4/1953 | Jenny ......................... | 324/331 |
| 5,285,986 | A | 2/1994 | Hagenlocher ................. | 244/97 |
| 5,339,684 | A | 8/1994 | Jircitano et al. ............ | 73/178 R |
| 5,357,802 | A | 10/1994 | Hofmeyer et al. .......... | 73/382 G |
| 5,359,889 | A | 11/1994 | Jircitano et al. ............ | 73/178 R |
| 5,922,951 | A | 7/1999 | O'Keefe et al. ............. | 73/382 G |
| 5,962,782 | A | 10/1999 | O'Keefe et al. ............. | 73/382 R |
| 6,278,948 | B1 | 8/2001 | Jorgensen et al. ........... | 702/6 |
| 6,397,063 | B1 * | 5/2002 | Sessions et al. ............. | 455/425 |
| 6,658,935 | B1 | 12/2003 | Feinberg ..................... | 73/382 G |
| 2003/0033086 | A1 | 2/2003 | Lee et al. .................... | 702/5 |
| 2003/0209070 | A1 | 11/2003 | Dosch et al. ................ | 73/382 G |

FOREIGN PATENT DOCUMENTS

| | | |
|---|---|---|
| GB | 2 274 951 | 8/1994 |
| WO | WO 02/103398 | 12/2002 |
| WO | WO 03/032015 | 4/2003 |
| WO | WO 03/076970 | 9/2003 |

OTHER PUBLICATIONS

Sander Stephen et al., "Advantages of close line spacing in airborne gravimetric survey," *Leading Edge*, vol. 22, No. 2, p. 136-137 (Feb. 2003).

(Continued)

*Primary Examiner*—D. McElheny, Jr.
(74) *Attorney, Agent, or Firm*—McDonnell Boehnen Hulbert & Berghoff LLP

(57) ABSTRACT

A geophysical survey is conducted, using specialized instruments, to measure the gravity field by flying over a terrain of interest. A series of nominally parallel survey lines can be flown until a total region to be surveyed has been covered. The geophysical survey data is collected using an airship or self-propelled lighter-than-air craft sometimes referred to as a dirigible or blimp. In particular, a rigid airship may be used, that includes all extensions, like fins and a control car, attached to a rigid frame.

24 Claims, 5 Drawing Sheets

OTHER PUBLICATIONS

Eaton Susan, "In Gravity's Pull," *New Technology Magazine*, p. 1-4 (Apr.-May 2003).

Argyle Malcolm, et al. "AIRGrav results: a comparison of airborne gravity data with GSC test site data," *Leading Edge: Oct. 2000 Soc of Exploration Geophysicists*, vol. 19, No. 10, p. 1134, 1136, 1138 (Oct. 2000).

Derek Fairhead J., et al. "Advances in gravity survey resolution," *Leading Edge*, vol. 21, No. 1, p. 36-37, (Jan. 2002).

Li, Yaoguo, "Processing gravity gradiometer data using an equivalent source technique," *Gravity and Magnetics Research Consortium*, Department of Geophysics, Colorado School of Mines, Golden Co., no date.

* cited by examiner

METHOD AND SYSTEM FOR GEOPHYSICAL DATA ACQUISITION ON AN AIRSHIP

FIELD OF INVENTION

The present invention relates to methods for processing geophysical survey data, and more particularly, to acquiring geophysical survey data on a non-fixed wing aircraft.

BACKGROUND

Gravity surveying is one technique in modern exploration for mineral and petroleum commodities. For example, detection of geophysically significant subsurface anomalies potentially associated with ore bodies or hydrocarbon deposits can be made using gravity surveying techniques since the existence of gravitational anomalies usually depends upon the presence of an excess or deficit mass associated with the deposit. The presence of the deposit can be associated with a gravitational anomaly of the body. A body of ore can be 0.00002% of the normal Earth gravity field, for example. This relatively small effect is normally measured in units of milli gals (mGal), which is the unit for the free air and Bouguer gravity field measurements (1 mGal is equivalent to $10^{-5}$ m/s$^2$).

Many gravitational measurements have been made using instruments of the LaCoste/Romberg type that are essentially ultrasensitive spring balances detecting a small difference in weight caused by the gravity anomaly. The measurements are subject to a wide variety of environmental influences, and measurements should be performed relative to a standard point that is used regularly during the survey as a fixed reference for removal of drifts in the instrument.

In addition, some large scale geophysical prospecting has progressed towards gradiometry. In principle, measurement of a gradient of a gravity field over a known baseline allows accelerations due to motion of the platform itself to be cancelled out. Gravity gradients are the spatial derivative of the gravity field, and have units of mGal over distance such as mGal/m. The standard unit of gravity gradiometry is the Eötvös (E), which is equal to $10^{-9}$/s$^2$ or a tenth of a mGal over a kilometer (e.g., gradient signatures of shallow Texas salt domes are typically 50-100 E).

One type of gradiometry that has been used is three-dimensional Full Tensor Gradient (3D FTG) technology. FTG technology was developed by the US Navy and later adapted to the Oil & Gas industry to complement seismic technology and provide an independent method of imaging underwater salt and basalt areas, for example. Thus, gravity gradient measurements were originally collected using marine vessels or large ships to survey oceans. For example, using Bell Geospace's Marine-FTG™ technology, gravity gradient data collected from ocean surveys can be used to delineate subsalt and sub-basalt structures, predict bases of salt, and map other areas for valuable minerals.

Later, as gravity surveying moved on land, fixed-wing aircraft were adopted for data acquisition through airborne surveys. For example, a fixed-wing aircraft, such as a Cessna Grand Caravan, could be modified for airborne testing and evaluation, such as used within Bell Geospace's Air-FTG® technology. The success of airborne gravity gradient surveying to cover wide onshore areas with high precision data acquisition has attracted the interest of the mining industry. However, while such data is very useful for mineral exploration, there continues to be a desire to produce higher quality data.

SUMMARY

Within embodiments disclosed below, a method for acquiring geophysical survey data is provided. The method includes providing a gravity gradiometer on an airship that can acquire geophysical data indicating a spatial rate of change of the Earth's gravity field, and collecting data in an acceleration environment having no more than about a 40 millG standard deviation. For example, the data can be collected in an aircraft that has a vertical acceleration about the nominal value of the earth's gravity of no more than about a 40 millG standard deviation.

Using the airship, geophysical data can be collected by flying at speeds in the range of about 10 to about 40 knots, and at altitudes above ground level in the range of about 150 feet to about 250 feet, which enables data to be collected with a frequency resulting in a number of data samples being about twice the ground speed (in meters) of the airship, for example.

Many types of airships exist, and the method for acquiring geophysical survey data can be performed using any type of airship. For example, the airship may be a blimp, a Zeppelin, or another airship with a rigid frame and gondola.

In another aspect, the method for acquiring geophysical survey data includes providing an airship that has a rigid frame and a gondola, and wherein control engines for the airship are attached to the rigid frame. The method further includes providing a full tensor gradient (FTG) instrument in the gondola of the airship that can acquire geophysical data, which indicates a spatial rate of change of the Earth's gravity field, and collecting the data indicating changes in gravity field.

These as well as other features, advantages and alternatives will become apparent to those of ordinary skill in the art by reading the following detailed description, with appropriate reference to the accompanying drawings.

DETAILED DESCRIPTION

A geophysical survey is conducted to measure the gravity field over an area, for example. A geophysical survey is conducted, using specialized instruments, by flying over a terrain of interest. A series of nominally parallel survey lines can be flown until the total region to be surveyed has been covered.

A geophysical survey may be conducted using one or more gravity gradiometer instruments (GGIs). For example, a system including a full tensor gradient (FTG) instrument that has three GGIs can be used. The three GGIs may be oriented in a manner such that, unlike a conventional gravimeter that offers data collection only in the vertical (z) direction, the three GGI system may acquire data from all directions. A GGI can measure the spatial rate of change of the Earth's gravity field and provide a signal from which the instantaneous gradient of gravity can be derived. (Note that a measurement of gravity gradient may be preferred for detection of gravity disturbances from an airborne platform because a direct measurement of gravity cannot distinguish the gravity signal from accelerations of the instrument associated with the motion of the aircraft in the frequency range that is significant for subsurface anomaly detection). Using gravity gradient signals, detection of geophysically significant subsurface anomalies potentially associated with ore bodies or hydrocarbon deposits can be made since the existence of gravitational anomalies usually depends upon the presence of an excess or deficit mass associated with the deposit.

Figure 1A:
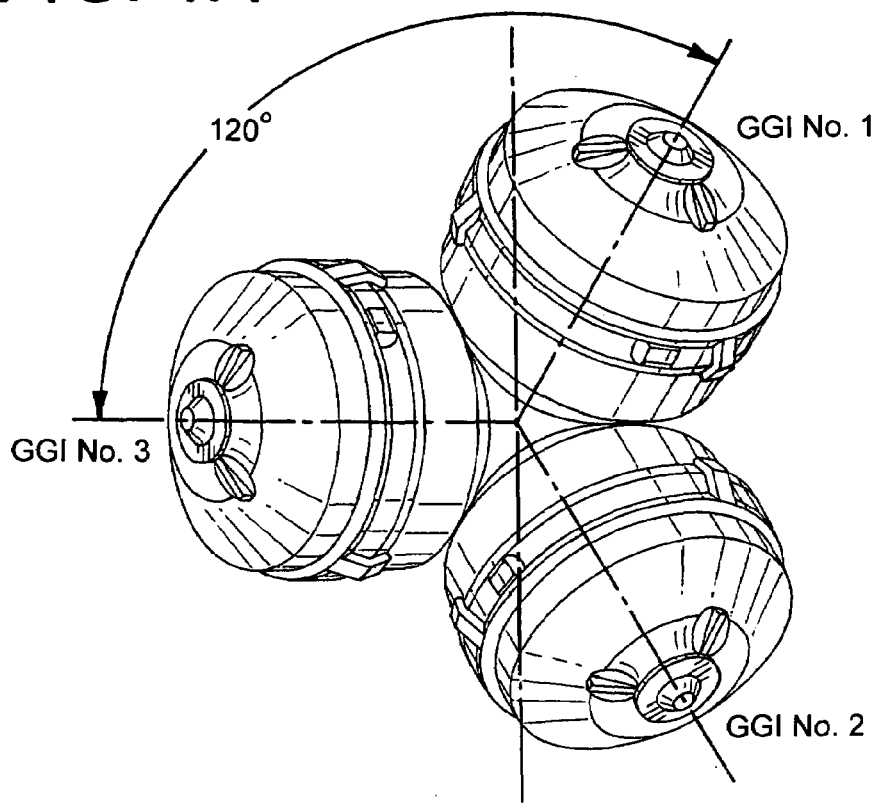
FIGS. 1A and 1B illustrate example embodiments of an orientation of three GGIs, such as within an FTG instrument.
Figure 1B:
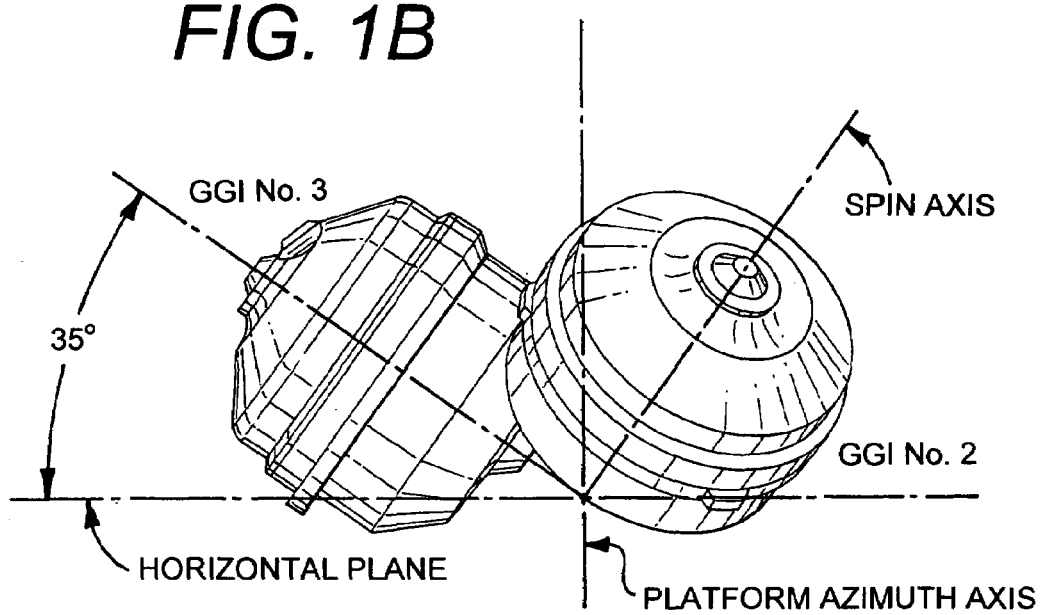

FIGS. 1A and 1B illustrate embodiments of an orientation of three GGIs, such as within an FTG instrument. FIG. 1A illustrates that each of the GGIs is oriented at 120° from each other relative to a plane through the center of each GGI and the platform azimuth axis. Further, each GGI is positioned such that it is approximately 35° from a horizontal plane (e.g., and approximately 55° from a vertical plane) as shown in FIG. 1B. This is one unique configuration in which the three GGI axes are mutually perpendicular in addition to each forming an equal angle with the vertical axis. Using the configurations illustrated in FIGS. 1A and 1B, the three GGI system may collect data from all directions. The GGI's may be mounted on a three gimbaled stabilized platform. The azimuth gimbal can be set to carousel (e.g., rotate) at a commanded rate, such as 300 degrees/hour, for example. Rotation of the GGI's through all the planes may allow for improved noise reduction, for example.

The GGIs illustrated in FIG. 1 may be any type of GGI such as, for example, the type described in U.S. Pat. No. 5,357,802 to Hofmeyer, et al., entitled "Rotating Accelerometer Gradiometer," which is entirely incorporated herein by reference, as if fully set forth in this description. Other GGIs may be used as well. Further, gradiometers may be combined into one component, such as a Full Tensor Gradient (FTG) instrument like the FTG System developed and manufactured by Lockheed Martin®, for example.

The GGIs of the FTG instrument in FIG. 1 measure gradients of the nine tensor components of the gravity gradient tensor. The gradient (e.g., first derivative) of the gravitational acceleration is expressed by a symmetric tensor $T_{\mu\nu}$ defined as:

$$T_{\mu\nu} = \begin{bmatrix} Txx & Txy & Txz \\ Tyx & Tyy & Tyz \\ Tzx & Tzy & Tzz \end{bmatrix} \qquad \text{Equation (1)}$$

where the components of the tensor $T_{\mu\nu}$ describe the nine components of the gravity gradients and the tensor $T_{\mu\nu}$ is the rate of change of the u component of the gravity vector with displacement in the v direction. Five of the tensor components are independent, and four are redundant as follows:

Txy=Tyx

Txz=Tzx

Tyz=Tzy $Tzz=-(Txx+Tyy)$      Equation (2)

The first three conditions in Equation (2) arise from the potential field relations, and the forth condition is a consequence of the gravitational potential being a solution to the Laplace equation.

Further, inline components of the gravity gradient tensor are defined as the Txx, Tyy, and Tzz components, and cross components are defined as the Txy, Txz and Tyz components. For example, cross signals are gradients measured when any two accelerometers align horizontally. In-line gradients are measured when the same accelerometers are at a 45 degree angle to horizontal. A gravity gradiometer outputs one cross and one inline signal. Thus, an FTG that includes three GGIs will output three inline and three cross signals.

Figure 2:
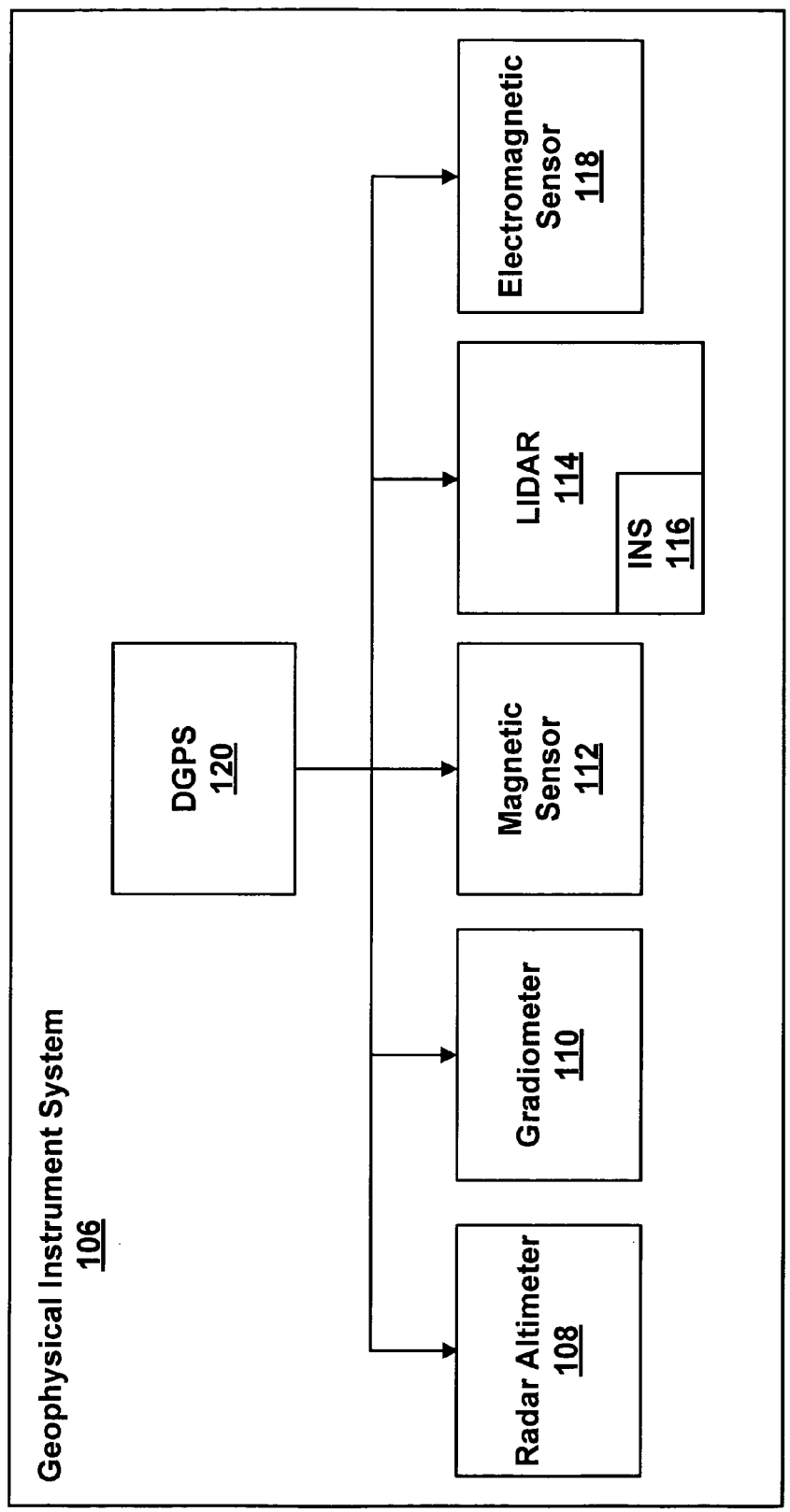
FIG. 2 is a block diagram illustrating one embodiment of a geophysical instrument system.

Other instruments may also be used to conduct a geophysical survey. FIG. 2 is a block diagram illustrating one embodiment of a geophysical instrument system 106, which may collect geophysical data. The system 106 includes a radar altimeter 108 that is used by aircraft to determine its height above terrain. The radar altimeter 108 determines height above terrain by using radar technology to measure the vertical distance between the aircraft and terrain. The radar altimeter 108 transmits an electronic pulse in the microwave frequency to the Earth's surface. The microwave pulse reflects off the surface and returns to the sensor. Altitude is determined from the pulse travel time (from transmit to receive) and from the waveform of the returned pulse.

The system 106 also includes a gradiometer 110 (such as illustrated in FIG. 1) that measures the spatial rate of change of the Earth's gravity field. The system 106 further includes a magnetic sensor 112 that measures distortions and additions to the magnetic field of the Earth due to rocks and minerals below the aircraft 102. For example, the magnetic sensor 112 detects the strength and direction of a magnetic field.

In addition, the system 106 includes a light detection and ranging (LIDAR) sensor 114 that transmits light out to a target and the light interacts with and is changed by the target. Some of the transmitted light is reflected and/or scattered back to the LIDAR sensor 114 where it is analyzed. The change in properties of the light enables properties of the target to be determined. For example, the time for the light to travel out to the target and back to the LIDAR sensor 114 can be used to determine the range to the target. The readings from the LIDAR sensor 114 can be used for correction of gradients originating from the terrain, for example.

The LIDAR sensor 114 includes an inertial navigation system (INS) 116. The INS 116 may be included within the geophysical instrument system 106 to provide a strap-down INS for the system 106. For example, the LIDAR sensor 114 may be strapped-down to the aircraft 102, therefore the INS 116 is a strapped-down INS that measures changes in a moving frame of reference, e.g., the aircraft's fixed axes. Furthermore, the radar altimeter 108 and the magnetic sensor 112 may be coupled to the INS 116 to receive navigational measurements in the aircraft's frame of reference. In contrast, the gradiometer 110 may be coupled to a gimbaled INS to receive INS readings in the gradiometer's frame of reference.

The system 106 can also include an electromagnetic sensor 118 that measures the effects of electrical conductivities of rocks and minerals below the aircraft 102. The system 106 further includes a differential global positioning system (DGPS) sensor 120. DGPS is a method of providing differential corrections to a global positioning system (GPS) receiver to improve the accuracy of the navigation system. The GPS is a satellite based navigation system that provides real time position, velocity and timing information. By receiving and processing navigation data from three or more satellites, a GPS receiver can calculate its position on the Earth's surface. Using this position, one or more reference receivers at known positions can provide DGPS corrections.

The radar altimeter 108, gradiometer 110, magnetic sensor 112, LIDAR 114, and electromagnetic sensor 118 are each connected to the DGPS 120 to receive position information. Thus, these sensors in the geophysical instrument that are connected to the DGPS 120 can tag data collected during a survey with position coordinates so that an operator will have knowledge of where the data was collected.

In an alternative embodiment, each sensor in the geophysical instrument system 106 (e.g., the radar altimeter 108, gradiometer 110, magnetic sensor 112, LIDAR 114, and electromagnetic sensor 118) may include its own internal or external GPS/DGPS system. Other satellite based positioning systems such as GLONASS, Galileo, WAAS or EGNOSS can also be used.

The system 106 may include more or fewer sensors and/or components as well. For example, the geophysical instrument system 106 may include peripheral equipment, such as a system control and monitoring computer, a survey planning and tracking computer, internal GPS systems, satellite communication systems, and data processing and archival systems. When required, for marine applications, a multi-beam echo-sounder system could also be included for a swath bathymetry measurement and correction of free air gradients. In addition, some of the components of the system 106 can be combined into one component, such as including the gravity gradiometer 110 within a Full Tensor Gradient (FTG) instrument, which can perform the functions of the geophysical instrument 106 and the inertial platform 104. It should be understood that this and other arrangements described herein are set forth for purposes of example only, and other arrangements and elements can be used instead and some elements may be omitted altogether. Further, many of the elements described herein are functional entities that may be implemented as hardware, firmware, or software, and as discrete components or in conjunction with other components, in any suitable combination and location.

A geophysical survey may be conducted using the system 106 on board many different types of airborne vessels to cover large areas of land in an efficient manner. In an exemplary embodiment, geophysical survey data is collected using an airship. Any type of airship may be used. An airship is a self-propelled lighter-than-air craft with directional control surfaces, and is sometimes referred to as a dirigible or blimp. In particular, an airship is an airborne vehicle obtaining some lift from lighter-than-air gas, usually helium, contained in an envelope that is an outer covering of the airship.

An airship provides a unique environment for collecting geophysical data. Within a turbulent environment, the airship provides a calm surrounding for collecting data, similar to that which can be provided on a marine vessel, for example. The calm and tranquil environment that the airship provides is in stark contrast to that provided on a fixed-wing aircraft or a helicopter, which both provide lower signal to noise environments. For high quality measurements, a high signal-to-noise ratio and high data resolution is desirable, and an airship can achieve both by providing a low turbulent environment at low speeds.

Many different types of airships exist. Airships that have their shape due to the pressure of the lifting-gas inside the envelope are of the non-rigid type. All extensions, like fins and a control car, on the airship are attached to the envelope. Driving elements are attached to the gondola or control car.

Airships with a rigid frame are usually referred to as rigid airships, which have certain technical advantages over blimps, especially with regard to their steerability, for example. A rigid airship may be referred to as a Zeppelin, a name that originates from Count Ferdinand von Zeppelin, who designed such airships. Zeppelins may include a carbon fiber internal-frame (or duralumin or other lightweight alternatives such as high strength to weight materials). One example of a Zeppelin is the Zeppelin New Technology (NT) airship. Other examples of rigid or semi-rigid airships are also possible, such as airships that are a hybrid between a rigid airship and a blimp.

Figure 3:
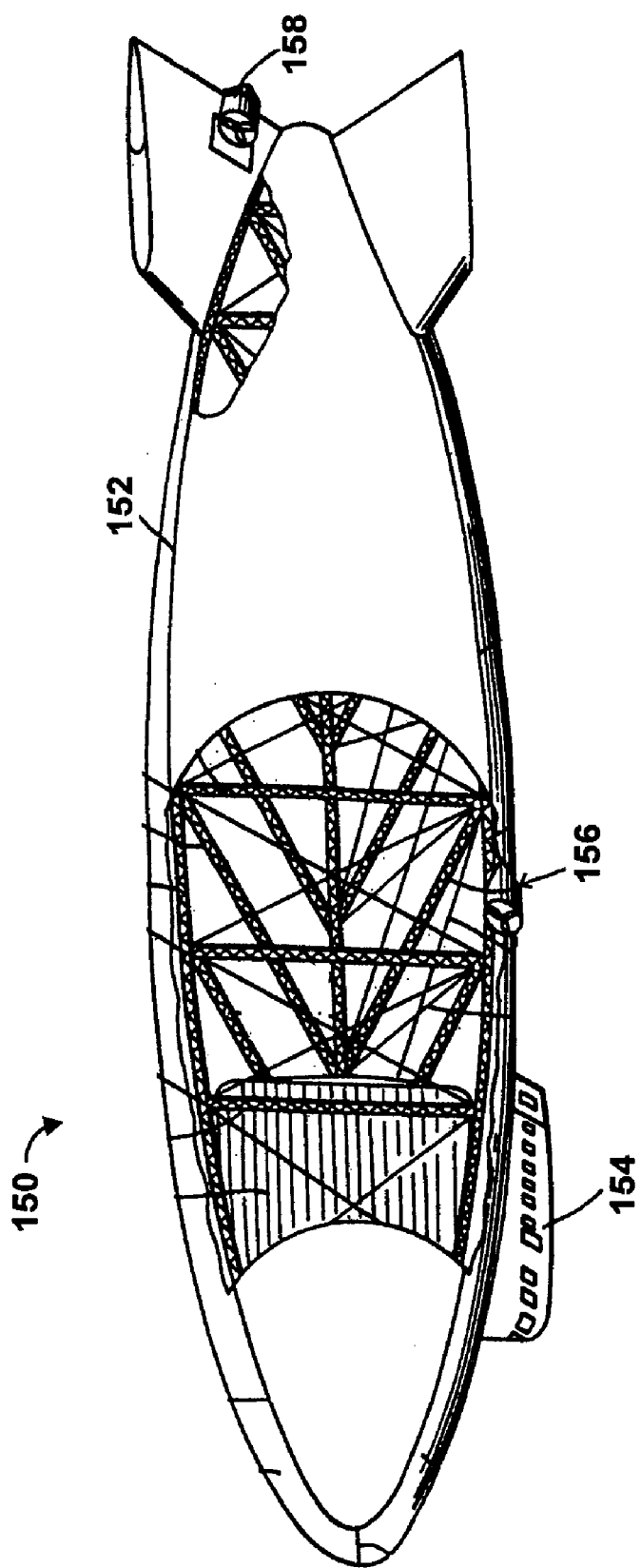
FIG. 3 illustrates one example of a rigid-airship that is used to collect gravity gradient data.

FIG. 3 illustrates one example of a rigid-airship 150 that is used to collect gravity gradient data. Rigid airships receive their outer shape through a rigid structure, which can be made of an aluminum alloy (e.g., Duraluminium). The rigid structure may be formed of longitudinal girder and cross-rings, also made of girders. The structure may be a triangular frame, inscribed within a circumference of a hull fabric. Horizontal spars or longerons may run the entire length of the structure connecting the vertices of the vertical triangular trusses, which can also be supported by other internal cross-bracing.

The whole rigid structure is covered with fabric to enable a better aerodynamic style. The fabric is referred to as an envelope 152. Helium is contained within the envelope 152, and can be included in three separate cells. For example, inflatable and deflatable air chambers are provided for steering purposes in addition to inflatable lifting gas cells.

All of the rigid airship's control surfaces and propulsion units as well as a control car or gondola 154 are supported by the airship's rigid frame. For example, forward propellers 156 vectorable to 120 degrees and with reversible pitch control can be attached to the sides of the airship (only one is shown). At the rear of the airship, a single engine 158 may drive two propellers, e.g., a large vectorable fan facing to the rear or straight down and a smaller propeller horizontally mounted at ninety degrees to the centerline, for example.

Figure 4:
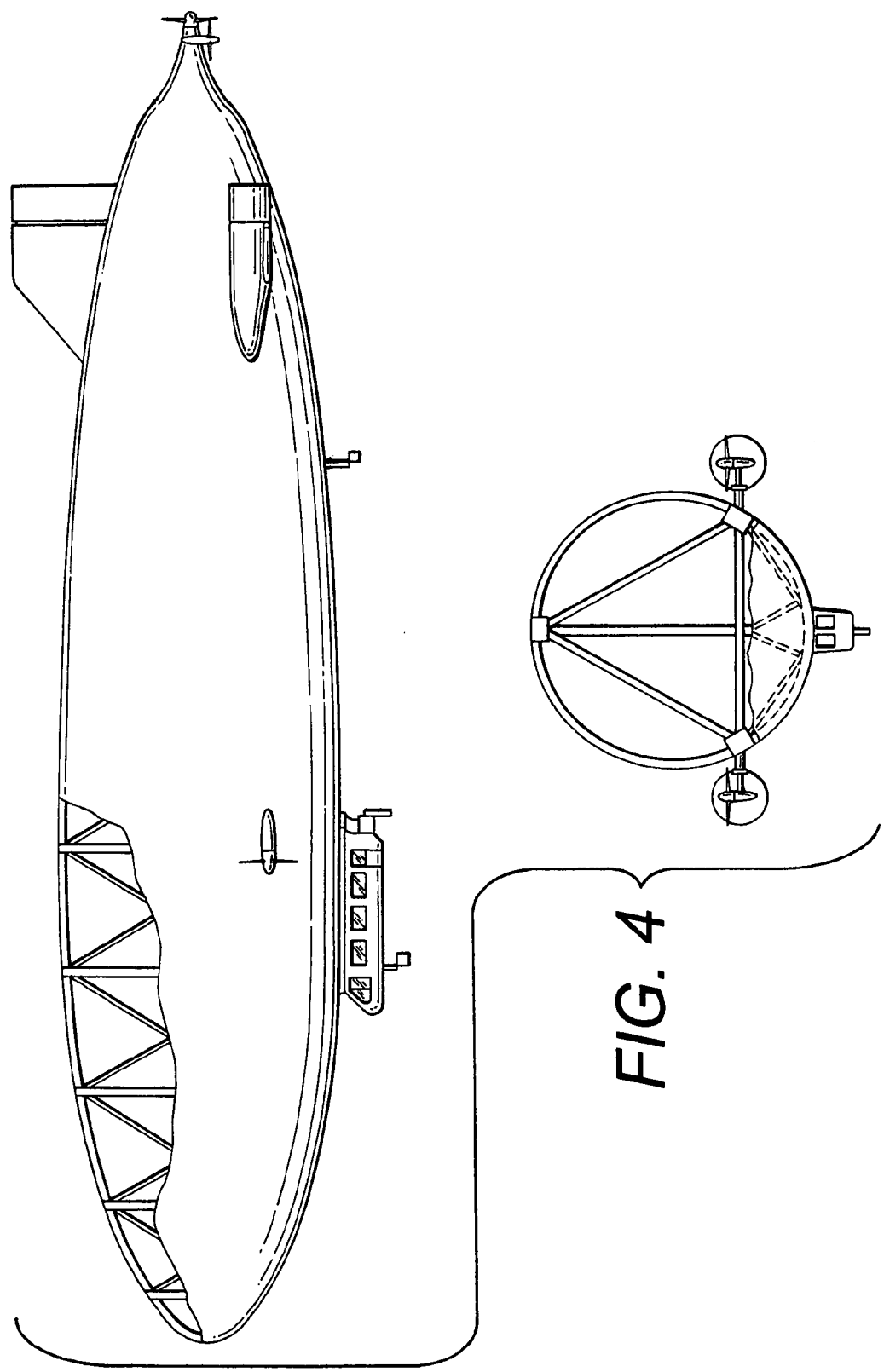
FIG. 4 illustrates a side and front view of another example of an airship.

FIG. 4 illustrates a side and front view of another example of an airship. The triangular rigid structure can be seen within the front view, for example. For more information regarding rigid airship designs, the reader is referred to U.S. Pat. No. 5,285,986, entitled "Rigid Airship with a Carrier Frame of Ribs and Beams enclosed by Skin Sections forming an Envelope," the entire contents of which are herein incorporated by reference, as if fully set forth in this description. Many other designs are possible as well. The airships illustrated in FIGS. 3 and 4 are only examples.

To collect geophysical data using the airship 150, some geophysical instruments may be positioned within the gondola 154 and others may be positioned outside the gondola, e.g., such as magnetic detectors or a LIDAR unit. For example, an FTG instrument can be installed within the gondola 154 to collect gravity gradient data. In addition, a gradiometer may be mounted directly to the gondola or may be mounted on a stabilized platform to further reduce sensitivity to the airship motion. Additional frames or platforms may be added as needed, for example, to spread the weight of the gradiometer to support a carbon fiber floor of the airship.

The airship can then be flown at low speeds, so as to enable the FTG instrument to collect data that has a high resolution over a geographical area. For example, Zeppelins are usually flown around 45 knots; however, to collect gravity gradient data, the Zeppelin may be flown at about 35 knots or about 17 m/sec. Currently, geographical data is collected using aircraft flying at speeds of 60 m/s. Airplanes cannot fly much slower at the desired altitudes. Thus, using an airship, data can be collected by flying within the range of about 15 to about 55 knots (groundspeed), or within the range of about 8 m/s to about 22 m/s, and by flying at the lower speeds, higher resolution data can be collected. Note that slower speeds enable use of slow speed ducted fans and propellers, which possibly results in lower vibration than other forms of aircraft, and in turn results in less noise generated enabling a better signal-to-noise ratio to be achieved.

At the low speeds mentioned above, a value of the airship's vertical acceleration about the nominal value of the Earth's gravity can be less than about a 40 millG standard deviation (depending on the speed of the airship, lower or higher deviations from the nominal value of the Earth's gravity can be obtained). Using the airship will provide a lower vertical acceleration than using a fixed wing aircraft (for the same conditions of turbulent air), for example. The standard deviation is the square root of the sum of the measured acceleration samples minus 1 G $$\left(i.e., \; 9.8 \frac{m}{s^2}\right),$$

squared and divided by the number of samples over a specific time period as shown below in Equation (3). The standard deviation is expressed in millG or 10 meters/sec$^2$/ 1000 (1 millG is $\frac{1}{1000}$ of the Earth's gravity).

$$\sigma = \sqrt{\frac{1}{N} \sum_{i=1}^{N} (a - 1G)^2} \qquad \text{Equation (3)}$$

Thus, since the airship provides a low turbulent, slow environment from which signals are collected, the aircraft's vertical acceleration may not differ significantly from that of the Earth's gravity. As a result, geophysical signals can be collected while flying over land that would be similar (or close to) the signals that would be collected if standing on the land.

In addition, the Zeppelin's normal flying altitude is 1000 feet; however, to collect gravity gradient data, the Zeppelin is flown at about 250 feet, or anywhere in the range of about 150 feet to about 1000 feet. Contrast with current data collection altitudes on-board a fixed wing aircraft of about 80 to 120 m (e.g., 260-400 feet). A Zeppelin can fly at low altitudes using a take-off and landing engine configuration in which an aft engine is directed downward instead of rearward for improved height control. Further, a third rear engine on the airship provides additional directional control.

Lower flight altitudes result in an improved gravity gradient signal-to-noise ratio. For example, gravity gradients are expressed as:

$$T_{\mu\eta} \alpha \frac{1}{r^3} \qquad \text{Equation (4)}$$

where the Tensor component, $T_{\mu\eta}$, (gravity gradient) is inversely proportional to the cube of r, which is the distance from the measuring system to the body being measured.

Thus, since a signal decays as the cube of the distance from the body, flying at lower altitudes or closer to the Earth's surface enables higher quality signals to be retrieved.

Performing gravity gradient surveys at low speeds and low altitudes allows for high resolution and low noise data (e.g., high signal-to-noise ratio) to be collected. For example, more data points per square foot will be collected, such as collecting one data point about every 31 meters at a ground speed of about 30 knots as in the current Air-FTG® system implementation. Gravity gradients are expressed in Eötvös units (E) to measure the rate of change, or gradient in the acceleration of gravity with horizontal distance (one Eötvös equals $10^{-7}$ Gal per meter), and changes in horizontal gradients are typically below 100 E for the normal field. Thus, gravity-gradient anomalies indicating mineral or other underground deposits are indicated by small changes in the normal field, such as about 10-50 E, for example. Small deposits will not affect the field as much as large deposits, and thus will have small effects on the normal field, e.g., about a 1 E to about a 5 E change. As a result, high resolution data can be very helpful in locating small gravity anomalies, and it may even be possible to collect data that indicates changes in the gravity field within about 1-5 E by using an airship.

In addition, referring back to FIGS. 3 and 4, note that the propellers 156 and 158 are not connected to the gondola 154, but rather to the rigid frame of the airship 150. Since the FTG gravity gradient instruments are located within the gondola 154, noise generated by the engines will not affect the data collection as much as within typical FTG data collection using an airplane (e.g., where the FTG instruments are located within the same platform as the aircraft engines). For example, the design of the Zeppelin NT allows for the engines being further removed from the FTG with reduced vibration induced noise, which further enables low noise data signals to be collected.

Furthermore, airships that do not depend upon aerodynamic lift have lower levels of turbulence than other aircraft platforms, which results in lower acceleration induced noise within a gravity gradient signal. This enables better resolution and lower noise levels within signals.

Zeppelins generally also have high maneuverability when compared to non-rigid frame airships, and combined with low speed and low flight surveys, the Zeppelin airship is a desirable platform to use for FTG data collection. The maneuverability of the Zeppelin NT, for example, due to the engines positioned on sides of the airship, causes the Zeppelin NT to be a desirable airship for FTG data collection. Further, a Zeppelin uses control surfaces (e.g., the envelope and fins) like an aircraft, which may be less efficient at slow speeds, and thus a pilot can swivel the forward engines upwards, typically by 20°, to improve vertical control for additional maneuverability.

Low flight and low speed gravity surveying also provides additional safety precautions. For example, many terrain obstacles may be present when conducting low flight surveys; however, while also flying at low speeds, the airship can maneuver about the terrain more easily. Further, areas that may not be surveyable using an aircraft can be surveyed using an airship. For example, planes may not be able to fly close enough to areas with steep hills or with varying terrain, whereas an airship may be able to more effectively maneuver such terrain.

Using an airship to collect gravity gradient data can also allow for longer data collection periods. For example, air ships have higher fuel efficiency than a fixed wing aircraft platform at slow speeds, which results in longer duration and lower cost gravity surveys. As one example, an airship may be able to conduct a gravity survey for a duration of about 8 hours before refueling.

Figure 5:
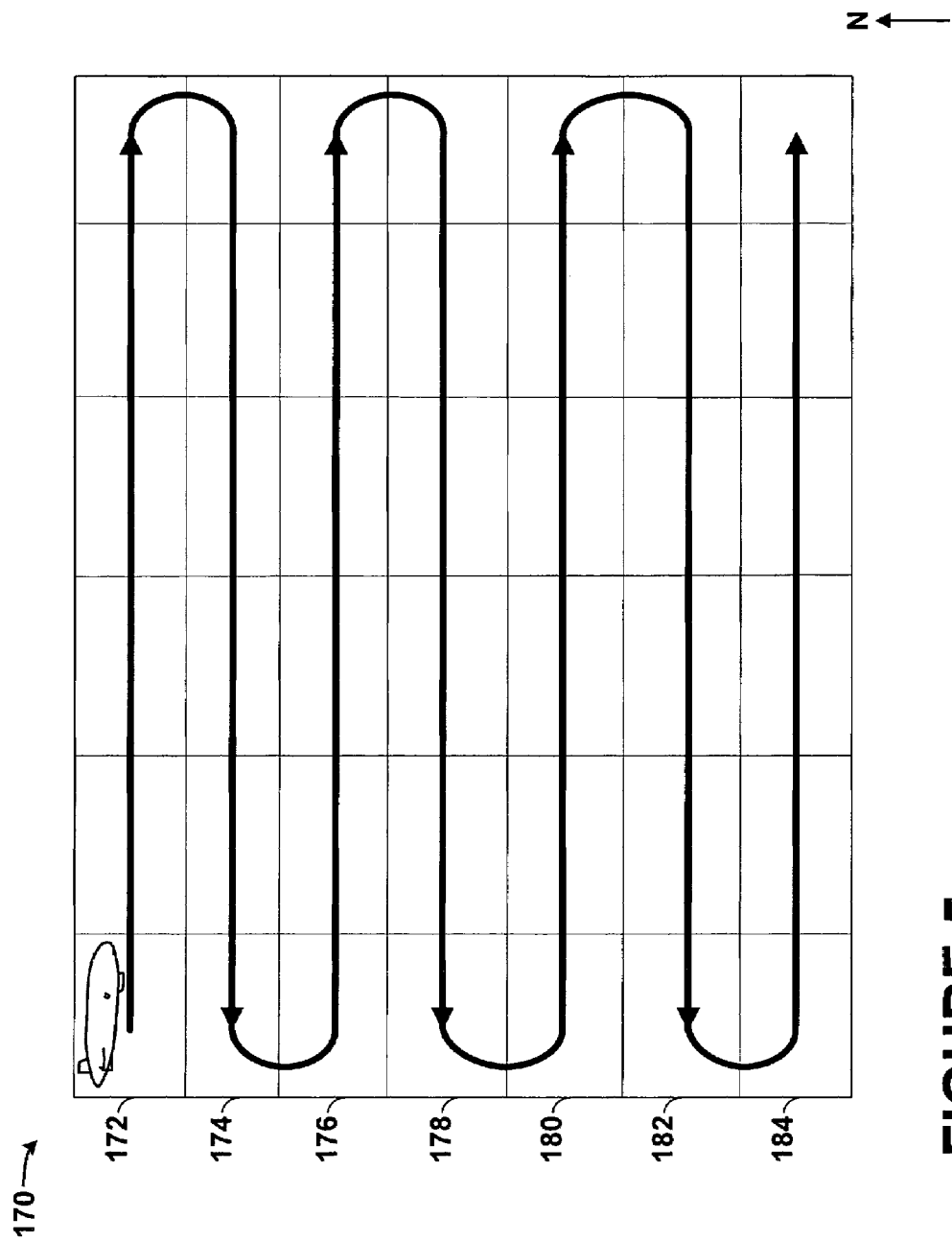
FIG. 5 illustrates one example of a gravity survey flight pattern.

The design of the Zeppelin NT provides for the third rear mounted engine that increases control of the airship and enables the airship to substantially stay on a desired path. Referring to FIG. 5, geophysical data is recorded and associated with a flight trajectory that is generally a straight line, and FIG. 5 illustrates one example of a survey flight pattern. A survey area 170 can be divided in a grid, resulting in seven rows 172-184 corresponding to flight paths, for example. The airship may then fly a straight path for a certain distance to collect geophysical data along that path. Subsequently, the airship can reverse directions to fly a substantially straight path to collect geophysical data from the terrain that is South of the first flight path. Thus, the airship can fly in a series of nominally parallel survey lines until the total survey area 170 has been covered. In this example, the airship flies from North to South; however, the flight paths could be configured in any manner. The maneuverability of the Zeppelin allows for substantially straight lines to be flown.

An airship can fly efficiently at lower speeds than a fixed wing aircraft, which in turn, results in lower levels and lower frequencies of vertical acceleration and in a configuration that results in lower engine noise. Each of these improvements results in lower noise contained within measurements and improved resolution than currently possible when using fixed wing or rotary wing aircraft for geophysical survey flights.

It is intended that the foregoing detailed description be regarded as illustrative rather than limiting, and it is intended to be understood that the following claims including all equivalents define the scope of the invention.

What is claimed is:

1. A method for acquiring geophysical survey data comprising:
    providing a gravity gradiometer on an airship, the gravity gradiometer operable to acquire geophysical data, the geophysical data indicating a spatial rate of change of the Earth's gravity field;
    collecting the geophysical data in an acceleration environment having no more than about a 40 millG standard deviation; and
    recording the geophysical data.

2. The method of claim 1, wherein collecting the geophysical data in the acceleration environment having no more than about a 40 millG standard deviation comprises collecting data in an aircraft having a vertical acceleration about the nominal value of the earth's gravity of no more than about a 40 millG standard deviation.

3. The method of claim 1, further comprising flying the airship at speeds in the range of about 10 knots to about 50 knots.

4. The method of claim 1, further comprising flying the airship at altitudes above ground level in the range of about 150 feet to about 250 feet.

5. The method of claim 1, further comprising collecting data with a frequency of about one or more data points per about 30 meters at a ground speed of about 30 knots.

6. The method of claim 1, further comprising collecting data indicating changes in gravity field within the range of about 1 E to about 5 E.

7. The method of claim 1, wherein the gravity gradiometer is included within a full tensor gradient (FTG) instrument on the airship.

8. The method of claim 1, further comprising providing additional instruments on the airship, the instruments selected from the group consisting of a radar altimeter, a magnetic sensor, a light detection and ranging (LIDAR) sensor, an inertial navigation system (INS), an electromagnetic sensor, a differential global positioning system (DGPS) sensor, and a real time kinetic GPS sensor.

9. The method of claim 1, wherein the airship is a blimp.

10. The method of claim 1, wherein the airship is a Zeppelin.

11. The method of claim 1, wherein the airship has a rigid frame that is covered with an envelope which contains a lighter than air gas.

12. The method of claim 11, wherein the airship includes a gondola and the gravity gradiometer is located within the gondola.

13. The method of claim 11, wherein control engines for the airship are attached to the rigid frame.

14. A method for acquiring geophysical survey data comprising:
    providing an airship that has a rigid frame and a gondola, wherein control engines for the airship are attached to the rigid frame;
    providing a full tensor gradient (FTG) instrument in the gondola of the airship, the full tensor gradient (FTG) instrument operable to acquire geophysical data, the geophysical data indicating a spatial rate of change of the Earth's gravity field;
    collecting the geophysical data indicating changes in gravity field; and
    recording the geophysical data.

15. The method of claim 14, wherein the airship farther includes an engine attached to the rigid frame at a rear of the airship.

16. The method of claim 14, wherein collecting the geophysical data comprises collecting data in an acceleration environment having no more than about a 40 millG standard deviation.

17. The method of claim 14, further comprising flying the airship at speeds in the range of about 10 knots to about 50 knots.

18. The method of claim 14, further comprising flying the airship at altitudes above ground level as low as about 150 feet.

19. The method of claim 14, further comprising flying the airship at altitudes above ground level in the range of about 150 feet to about 250 feet.

20. The method of claim 14, further comprising collecting data indicating changes in gravity field within the range of about 1 E to about 5 E.

21. The method of claim 14, further comprising collecting data indicating changes in gravity field within about 1 E.

22. The method of claim 14, wherein the airship is a Zeppelin.

23. A method for acquiring geophysical survey data comprising:
    providing an airship that has a rigid frame and a gondola, wherein control engines for the airship are attached to the rigid frame;
    providing a full tensor gradient (FTG) instrument in the gondola of the airship, the full tensor gradient (FTG) instrument operable to acquire geophysical data from the x, y, and z coordinate directions, the geophysical data indicating a spatial rate of change of the Earth's gravity field;

flying the airship at speeds in the range of about 10 knots to about 50 knots;

flying the airship at altitudes above ground level in the range of about 40 m to about 350 m;

collecting the geophysical data indicating changes in gravity field; and recording the geophysical data.

24. The method of claim 23, wherein the airship is a Zeppelin.

* * * * *